(12) United States Patent
Tang et al.

(10) Patent No.: US 11,838,064 B2
(45) Date of Patent: Dec. 5, 2023

(54) METHOD FOR CONTROLLING DISPLAY AND RELATED PRODUCTS

(71) Applicant: GUANGDONG OPPO MOBILE TELECOMMUNICATIONS CORP., LTD., Guangdong (CN)

(72) Inventors: Kai Tang, Guangdong (CN); Zhengpeng Tan, Guangdong (CN); Yun Chen, Guangdong (CN); Lizhong Wang, Guangdong (CN); Hai Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 468 days.

(21) Appl. No.: 17/237,835

(22) Filed: Apr. 22, 2021

(65) Prior Publication Data
US 2021/0242946 A1 Aug. 5, 2021

Related U.S. Application Data

(63) Continuation of application No. PCT/CN2019/112590, filed on Oct. 22, 2019.

(30) Foreign Application Priority Data

Oct. 26, 2018 (CN) .......................... 201811261423.3

(51) Int. Cl.
*H04B 15/02* (2006.01)
*G06F 3/16* (2006.01)
(Continued)

(52) U.S. Cl.
CPC ............. *H04B 15/02* (2013.01); *G06F 3/165* (2013.01); *H04R 3/02* (2013.01); *H04M 1/72454* (2021.01)

(58) Field of Classification Search
CPC ........... H04B 15/02; G06F 3/165; H04R 3/02; H04M 1/72454
See application file for complete search history.

(56) References Cited

U.S. PATENT DOCUMENTS

2014/0218352 A1* 8/2014 Zhao ................... H04W 52/027
345/214
2016/0065890 A1* 3/2016 Miura ....................... H04N 5/60
348/729

(Continued)

FOREIGN PATENT DOCUMENTS

| CN | 1893574 | 1/2007 |
|---|---|---|
| CN | 102122491 | 7/2011 |

(Continued)

OTHER PUBLICATIONS

SIPO, First Office Action for CN Application No. 201811261423.3, dated May 7, 2020.

(Continued)

*Primary Examiner* — Junpeng Chen
(74) *Attorney, Agent, or Firm* — Hodgson Russ LLP

(57) ABSTRACT

A method for controlling display and related products are provided. During outputting sound through a speaker of an electronic device, if an operating frequency of the speaker for playing the obtained first audio data is within an interference range of a first MIPI operating frequency of the MIPI of the display screen, and a percentage of interfered audio in the first audio data is greater than a first threshold, the first MIPI operating frequency of the MIPI of the display screen is adjusted to a target frequency such that a percentage of audio to be interfered in the first audio data is less than a second threshold, where second threshold is less than the first threshold.

20 Claims, 6 Drawing Sheets

(51) Int. Cl.
*H04R 3/02* (2006.01)
*H04M 1/72454* (2021.01)

(56) References Cited

U.S. PATENT DOCUMENTS

2016/0240182 A1    8/2016  Chaban et al.
2017/0208219 A1*   7/2017  Lee ......................... G09G 5/12

FOREIGN PATENT DOCUMENTS

| | | |
|---|---|---|
| CN | 104134415 | 11/2014 |
| CN | 104469354 | 3/2015 |
| CN | 105357033 | 2/2016 |
| CN | 106160759 A | 11/2016 |
| CN | 106714033 | 5/2017 |
| CN | 106936515 | 7/2017 |
| CN | 107948443 | 4/2018 |
| CN | 108446084 | 8/2018 |
| EP | 3355516 A1 | 8/2018 |
| JP | 2001292490 | 10/2001 |

OTHER PUBLICATIONS

SIPO, Notification to Grant Patent Right for Invention for CN Application No. 201811261423.3, dated Sep. 4, 2020.
WIPO, International Search Report for PCT/CN2019/112590, dated Jan. 10, 2020.
EPO, Extended European Search Report for European Application No. 19875591.0, dated Nov. 12, 2021.

* cited by examiner

METHOD FOR CONTROLLING DISPLAY AND RELATED PRODUCTS

CROSS-REFERENCE TO RELATED APPLICATION(S)

This application is a continuation of International Application No. PCT/CN2019/112590, filed on Oct. 22, 2019, which claims priority to Chinese Patent Application No. 201811261423.3, filed on Oct. 26, 2018, the entire disclosures of which are hereby incorporated by reference.

TECHNICAL FIELD

This disclosure relates to the field of electronic technology, and more particularly to a method for controlling display and related products.

BACKGROUND

When users use speakers to play audio and video files or make calls, requirements for sound effect are relatively high. In case that a mobile industry processor interface (MIPI) of a display screen used for data transmission operates at a fixed frequency, if a crossover frequency or a frequency multiplication of the fixed frequency of the MIPI is equal to an operating frequency of the speaker, the crossover frequency or the frequency multiplication may interfere with the operating frequency the speaker, which may cause the speaker to output noise or POP sound, thereby affecting play effect of the current audio.

At present, the interference to the speaker can be improved through hardware upgrade, but the hardware upgrade may result in increase in the cost and limited improvement. However, directly adjusting the operating frequency of the MIPI of the display screen cannot ensure that the crossover frequency or the frequency multiplication is not equal to the operating frequency of the speaker, and the play effect may also be affected. Therefore, how to reduce the interference of the operating frequency of the MIPI of the display screen to the operating frequency of the speaker is a problem to be solved.

SUMMARY

According to a first aspect, a method for controlling display is provided. The method includes the following. First audio data is obtained during outputting sound through a speaker of an electronic device, and an operating frequency of the speaker for playing the first audio data is obtained. A first MIPI operating frequency of an MIPI of a display screen is obtained. Determine that a percentage of interfered audio in the first audio data is greater than a first threshold, when the operating frequency of the speaker for playing the first audio data is interfered by the first MIPI operating frequency. The first MIPI operating frequency of the MIPI of the display screen is adjusted to a target frequency and a percentage of audio to be interfered in the first audio data is less than a second threshold, where the second threshold is less than the first threshold.

According to a second aspect, an electronic device is provided. The electronic device includes a display screen, a speaker, a processor, and a memory coupled to the processor and storing one or more programs. The one or more programs which, when executed by the processor, cause the processor to: obtain first audio data during outputting sound through the speaker of the electronic device, and obtain an operating frequency of the speaker for playing the first audio data; obtain a first MIPI operating frequency of an MIPI of the display screen; determine that a percentage of interfered audio in the first audio data is greater than a first threshold, in response to determining that the operating frequency of the speaker for playing the first audio data is interfered by the first MIPI operating frequency; adjust the first MIPI operating frequency of the MIPI of the display screen to a target frequency and a percentage of audio to be interfered in the first audio data is less than a second threshold, where the second threshold is less than the first threshold.

According to a third aspect, a non-transitory computer readable storage medium is provided. The non-transitory computer readable storage medium stores computer programs which, when executed, are operable with a computer to: obtain first audio data during outputting sound through a speaker of an electronic device, and obtain an operating frequency of the speaker for playing the first audio data; obtain a first MIPI operating frequency of an MIPI of a display screen; determine that a percentage of interfered audio in the first audio data is greater than a first threshold, in response to determining that the operating frequency of the speaker for playing the first audio data is interfered by the first MIPI operating frequency; adjust the first MIPI operating frequency of the MIPI of the display screen to a target frequency and a percentage of audio to be interfered in the first audio data is less than a second threshold, where the second threshold is less than the first threshold.

BRIEF DESCRIPTION OF THE DRAWINGS

To describe the technical solutions of the implementations of the disclosure or the related art more clearly, the following will give a brief description of accompanying drawings used for describing the implementations of the disclosure or the related art. Apparently, the accompanying drawings described in the following are merely some implementations of the disclosure. Those of ordinary skill in the art can also obtain other accompanying drawings based on the accompanying drawings described below without creative efforts.

DETAILED DESCRIPTION

In order to enable those skilled in the art to better understand solutions of the disclosure, technical solutions embodied in implementations of the disclosure will be described in a clear and comprehensive manner in conjunction with the accompanying drawings. It is evident that the implementations described herein are merely some rather than all the implementations of the disclosure. All other implementations obtained by those of ordinary skill in the art based on the implementations of the disclosure without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the disclosure. The phrase appearing in various places in the specification does not necessarily refer to the same implementations, nor does it refer to an independent or alternative implementation that is mutually exclusive with other implementations. It is expressly and implicitly understood by those skilled in the art that an implementation described herein may be combined with other implementations.

The electronic devices involved in the implementations of the disclosure may include various handheld devices, vehicle-mounted devices, wireless headphones, computing devices that have wireless communication functions or other processing devices connected to wireless modems, as well as various forms of user equipment (UE), mobile stations (MS), terminal devices, and the like, and the like. The electronic device may be, for example, a smart phone, a tablet computer, an earphone box, and the like. For convenience of description, the devices mentioned above are collectively referred to as the electronic devices.

Figure 1A:
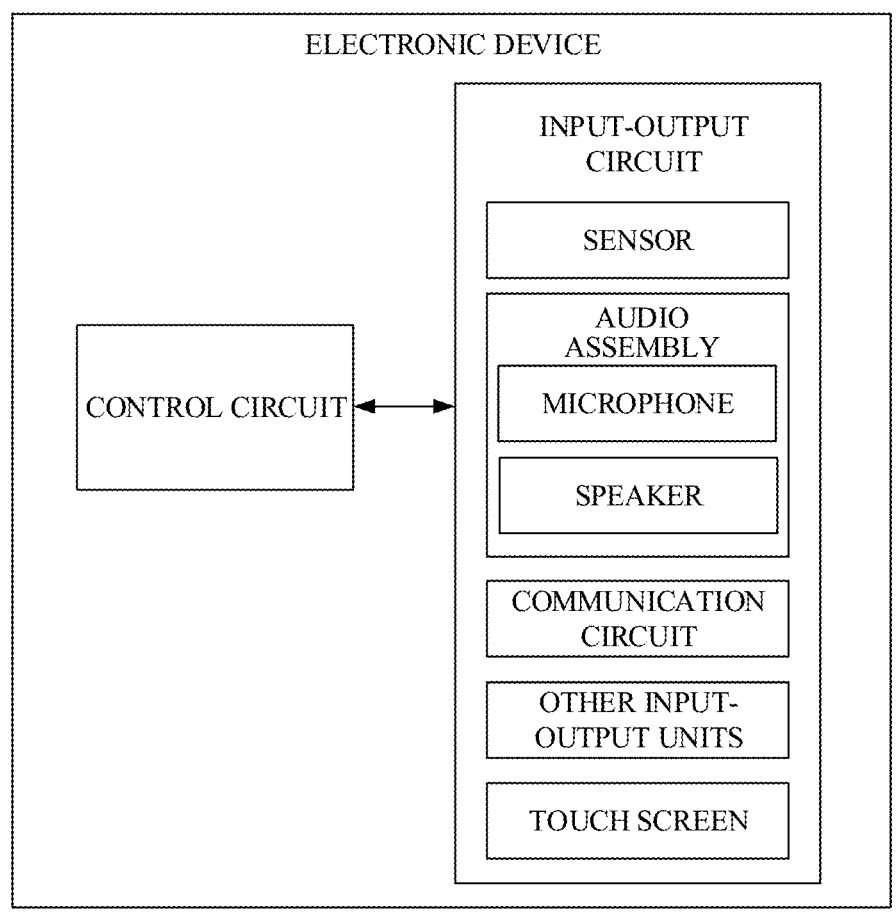
FIG. 1A is a schematic structural diagram illustrating an electronic device according to implementations of the disclosure.

FIG. 1A is a schematic structural diagram illustrating an electronic device according to implementations of the disclosure. The electronic device includes a control circuit and an input-output circuit coupled to the control circuit.

The control circuit may include a storage and processing circuit. The storage circuit in the storage and processing circuit may be a memory, such as a hard disk drive memory, a non-volatile memory (e.g., a flash memory or other electronically programmable read-only memories for forming a solid state drive, etc.), a volatile memory (e.g., a static or dynamic random access memory (RAM), etc.), or the like. The disclosure is not limited thereto. The processing circuit in the storage and processing circuit may be configured to control the operation of the electronic device. The processing circuit may be implemented based on one or more microprocessors, microcontrollers, digital signal processors, baseband processors, power management units, audio codec chips, application specific integrated circuits (ASICs), display driver integrated circuits, and the like.

The storage and processing circuit can be configured to run applications in the electronic device, such as an application playing incoming call alert sound, an application playing short message alert sound, an application playing alarm clock alert sound, an application playing media files, a voice over internet protocol (VOIP) phone call application, an operating system function, and the like. The applications may be configured to perform some control operations, such as playing incoming call alert sound, playing short message alert sound, playing alarm clock alert sound, playing media files, making a voice phone call, and other functions of the electronic device. The disclosure is not limited thereto.

The input-output circuit can be configured to enable the electronic device to realize input and output of data, that is, to allow the electronic device to receive data from external devices and to output data from the electronic device to the external devices.

The input-output circuit may further include a sensor. The sensor may include an ambient light sensor, an infrared proximity sensor based on light and capacitance, an ultrasonic sensor, a touch sensor (e.g., a light-based touch sensor and/or capacitive touch sensor, where the touch sensor may be part of a touch screen or may be separate from the touch screen), an acceleration sensor, a gravity sensor, and other sensors.

The input-output circuit may further include an audio assembly that includes a microphone for picking up or collecting audio (i.e., inputting audio), and a speaker for playing audio (i.e., outputting audio). The audio assembly may further include a tone generator and other components for generating and detecting sound.

The input-output circuit may further include one or more display screens. The display screens may include one or a combination of a liquid crystal display, an organic light emitting diode (OLED) display, an electronic ink display, a plasma display, and a display screen using other display technologies. The display screen may include an array of touch sensors, i.e., the display screen is a touch screen. The touch sensor may be a capacitive touch sensor formed by an array of transparent touch sensor electrodes, such as indium tin oxide (ITO) electrodes, or may be formed by adopting other touch technologies, such as sonic touch, pressure sensitive touch, resistive touch, optical touch, or the like. The disclosure is not limited thereto.

The input-output circuit may further include a communication circuit that may be configured to enable the electronic device to communicate with the external devices. The communication circuit may include an analog and digital input-output interface circuit, and a wireless communication circuit based on radio frequency signals and/or optical signals. The wireless communication circuit in the communication circuit may include a radio frequency transceiver circuit, a power amplifier circuit, a low noise amplifier, a switch, a filter, and an antenna. For example, the wireless communication circuit may include a circuit for supporting near field communication (NFC) by transmitting and receiving near field coupled electromagnetic signals. The communication circuit may include a near field communication antenna and a near field communication transceiver. The communication circuit may further include a cellular telephone transceiver circuit and antenna, or a wireless local area network transceiver circuit and antenna, or the like.

The input-output circuit may further include other input-output units. The input-output units may include buttons, joysticks, click wheels, scroll wheels, touch pads, keypads, keyboards, cameras, light emitting diodes, other status indicators, and the like.

The electronic device may further include a battery (not illustrated) for supplying electrical energy to the electronic device.

The following will describe the technical solutions of the disclosure in detail.

A method for controlling display is provided. The method is implemented in an electronic device including a display screen and a speaker. The method includes the following.

First audio data is obtained during outputting sound through the speaker, and an operating frequency of the speaker for playing the first audio data is obtained. A first MIPI operating frequency of an MIPI of a display screen is obtained. Determine that a percentage of interfered audio in the first audio data is greater than a first threshold, when the operating frequency of the speaker for playing the first audio data is interfered by the first MIPI operating frequency. The first MIPI operating frequency of the MIPI of the display screen is adjusted to a target frequency such that a percentage of audio to be interfered in the first audio data is less than a second threshold, where the second threshold is less than the first threshold.

In at least one implementation, the first audio data is obtained as follows.

A music file is obtained in response to detecting that the speaker is in a music-file playing state and a part of the music file that is not played is determined to be the first audio data. Alternatively, call voice is obtained in response to detecting that the speaker is in a call state and the call voice is determined as the first audio data.

In at least one implementation, the operating frequency of the speaker for playing the first audio data is obtained as follows. A sampling frequency of the first audio data is obtained. The operating frequency of the speaker for playing the first audio data is determined according to the sampling frequency.

In at least one implementation, an operating frequency-interference frequency correspondence table is established prior to determining that the operating frequency of the speaker for playing the first audio data is interfered by the first MIPI operating frequency. The operating frequency-interference frequency correspondence table is established as follows. Multiple MIPI operating frequencies of the MIPI of the display screen are obtained. For each MIPI operating frequency, at least one interference frequency corresponding to the MIPI operating frequency is determined. The operating frequency-interference frequency correspondence table for the multiple MIPI operating frequencies is established according to the at least one interference frequency corresponding to each MIPI operating frequency.

In at least one implementation, determine that the operating frequency of the speaker for playing the first audio data is interfered by the first MIPI operating frequency as follows. Determine that the operating frequency of the speaker for playing the first audio data matches an interference frequency in the operating frequency-interference frequency correspondence table. Obtain an MIPI operating frequency corresponding to the interference frequency. Determine that the operating frequency of the speaker for playing the first audio data is interfered by the first MIPI operating frequency in response to determining that the MIPI operating frequency corresponding to the interference frequency matches the first MIPI operating frequency.

In at least one implementation, the following can be conducted prior to determining that the percentage of the interfered audio in the first audio data is greater than the first threshold. R periodic audio blocks are obtained by dividing the first audio data into the R periodic audio blocks according to a preset period, where R is an integer greater than 0. Determine S periodic audio blocks interfered by the first MIPI operating frequency from the R periodic audio blocks, S being an integer greater than 0 and not greater than R. The percentage of the interfered audio in the first audio data is obtained according to the R periodic audio blocks and the S periodic audio blocks interfered by the first MIPI operating frequency.

In at least one implementation, determine the periodic audio blocks interfered by the first MIPI operating frequency as follows. For each periodic audio block interfered by the first MIPI operating frequency: obtain multiple audio units by dividing the periodic audio block into the multiple audio units according to at least one sampling period corresponding to the periodic audio block, determine the number of audio units that are interfered by the first MIPI operating frequency from the plurality of audio units, obtain the number of audio units that are interfered by the first MIPI operating frequency from the plurality of audio units, and determine that the periodic audio block is interfered by the first MIPI operating frequency in response to the percentage of the interfered audio units in the plurality of audio units being greater than a third threshold.

In at least one implementation, the first MIPI operating frequency of the MIPI of the display screen is adjusted to the target frequency as follows. A target value of a screen parameter associated with the target frequency is obtained. A value of the screen parameter is adjusted to the target value and the first MIPI operating frequency of the MIPI of the display screen is adjusted to the target frequency.

An electronic device is provided. The electronic device includes a display screen, a speaker, a processor, and a memory coupled to the processor and storing one or more programs. The one or more programs which, when executed by the processor, cause the processor to: obtain first audio data during outputting sound through the speaker of the electronic device, and obtain an operating frequency of the speaker for playing the first audio data; obtain a first MIPI operating frequency of an MIPI of the display screen; determine that a percentage of interfered audio in the first audio data is greater than a first threshold, in response to determining that the operating frequency of the speaker for playing the first audio data is interfered by the first MIPI operating frequency; adjust the first MIPI operating frequency of the MIPI of the display screen to a target frequency such that a percentage of audio to be interfered in the first audio data is less than a second threshold, where the second threshold is less than the first threshold.

In at least one implementation, the one or more programs executed by the processor to obtain the first audio data are executed by the processor to: obtain a music file in response to detecting that the speaker is in a music-file playing state and determine a part of the music file that is not played to be the first audio data; obtain call voice in response to detecting that the speaker is in a call state and determine the call voice as the first audio data.

In at least one implementation, the one or more programs executed by the processor to obtain the operating frequency of the speaker for playing the first audio data are executed by the processor to: obtain a sampling frequency of the first audio data; determine, according to the sampling frequency, the operating frequency of the speaker for playing the first audio data.

In at least one implementation, the one or more programs, when executed by the processor, further cause the processor to: establish an operating frequency-interference frequency correspondence table, prior to determining that the operating frequency of the speaker for playing the first audio data is interfered by the first MIPI operating frequency. The one or more programs executed by the processor to establish the operating frequency-interference frequency correspondence table are executed by the processor to: obtain multiple MIPI operating frequencies of the MIPI of the display screen; determine, for each MIPI operating frequency, at least one interference frequency corresponding to the MIPI operating frequency; establish the operating frequency-interference frequency correspondence table for the plurality of MIPI operating frequencies according to the at least one interference frequency corresponding to each MIPI operating frequency.

In at least one implementation, the one or more programs executed by the processor to determine that the operating frequency of the speaker for playing the first audio data is interfered by the first MIPI operating frequency are executed by the processor to: determine that the operating frequency of the speaker for playing the first audio data matches an interference frequency in the operating frequency-interference frequency correspondence table; obtain an MIPI operating frequency corresponding to the interference frequency; determine that the operating frequency of the speaker for playing the first audio data is interfered by the first MIPI operating frequency in response to determining that the MIPI operating frequency corresponding to the interference frequency matches the first MIPI operating frequency.

In at least one implementation, the one or more programs, when executed by the processor, further cause the processor to: obtain R periodic audio blocks by dividing the first audio data into the R periodic audio blocks according to a preset period, R being an integer greater than 0, prior to determining that the percentage of the interfered audio in the first audio data is greater than the first threshold; determine S periodic audio blocks interfered by the first MIPI operating frequency from the R periodic audio blocks, S being an integer greater than 0 and not greater than R; obtain the percentage of the interfered audio in the first audio data according to the R periodic audio blocks and the S periodic audio blocks interfered by the first MIPI operating frequency.

In at least one implementation, the one or more programs executed by the processor to determine the periodic audio blocks interfered by the first MIPI operating frequency are executed by the processor to: for each periodic audio block interfered by the first MIPI operating frequency: obtain multiple audio units by dividing the periodic audio block into the plurality of audio units according to at least one sampling period corresponding to the periodic audio block, determine the number of audio units that are interfered by the first MIPI operating frequency from the plurality of audio units, obtain a percentage of interfered audio units in the plurality of audio units according to the number of the audio units that are interfered by the first MIPI operating frequency and the total number of the plurality of audio units, and determine that the periodic audio block is interfered by the first MIPI operating frequency in response to determining that the percentage of the interfered audio units in the plurality of audio units is greater than a third threshold.

In at least one implementation, the one or more programs executed by the processor to adjust the first MIPI operating frequency of the MIPI of the display screen to the target frequency are executed by the processor to: obtain a target value of a screen parameter associated with the target frequency; adjust a value of the screen parameter to the target value and adjust the first MIPI operating frequency of the MIPI of the display screen to the target frequency.

A non-transitory computer readable storage medium is provided. The non-transitory computer readable storage medium stores computer programs which, when executed, are operable with a computer to: obtain first audio data during outputting sound through a speaker of an electronic device, and obtain an operating frequency of the speaker for playing the first audio data; obtain a first MIPI operating frequency of an MIPI of a display screen; determine that a percentage of interfered audio in the first audio data is greater than a first threshold, in response to determining that the operating frequency of the speaker for playing the first audio data is interfered by the first MIPI operating frequency; adjust the first MIPI operating frequency of the MIPI of the display screen to a target frequency such that a percentage of audio to be interfered in the first audio data is less than a second threshold, where the second threshold is less than the first threshold.

In at least one implementation, the computer programs, when executed by the processor, further cause the processor to: obtain R periodic audio blocks by dividing the first audio data into the R periodic audio blocks according to a preset period, prior to determining that the percentage of the interfered audio in the first audio data is greater than the first threshold, where R is an integer greater than 0; determine S periodic audio blocks interfered by the first MIPI operating frequency from the R periodic audio blocks, S being an integer greater than 0 and not greater than R; obtain the percentage of the interfered audio in the first audio data according to the R periodic audio blocks and the S periodic audio blocks interfered by the first MIPI operating frequency.

In at least one implementation, to determine the periodic audio blocks interfered by the first MIPI operating frequency, the computer programs, when executed by the processor, cause the processor to: for each periodic audio block interfered by the first MIPI operating frequency: obtain multiple audio units by dividing the periodic audio block into the multiple audio units according to at least one sampling period corresponding to the periodic audio block, determine the number of audio units that are interfered by the first MIPI operating frequency from the plurality of audio units, obtain a percentage of interfered audio units in the plurality of audio units according to the number of the audio units that are interfered by the first MIPI operating frequency and the total number of the plurality of audio units, and determine that the periodic audio block is interfered by the first MIPI operating frequency in response to determining that the percentage of the interfered audio units in the plurality of audio units is greater than a third threshold.

In at least one implementation, to adjust the first MIPI operating frequency of the MIPI of the display screen to the target frequency, the computer programs, when executed by the processor, cause the processor to: obtain a target value of a screen parameter associated with the target frequency; adjust a value of the screen parameter to the target value, and adjust the first MIPI operating frequency of the MIPI of the display screen to the target frequency.

Figure 1B:
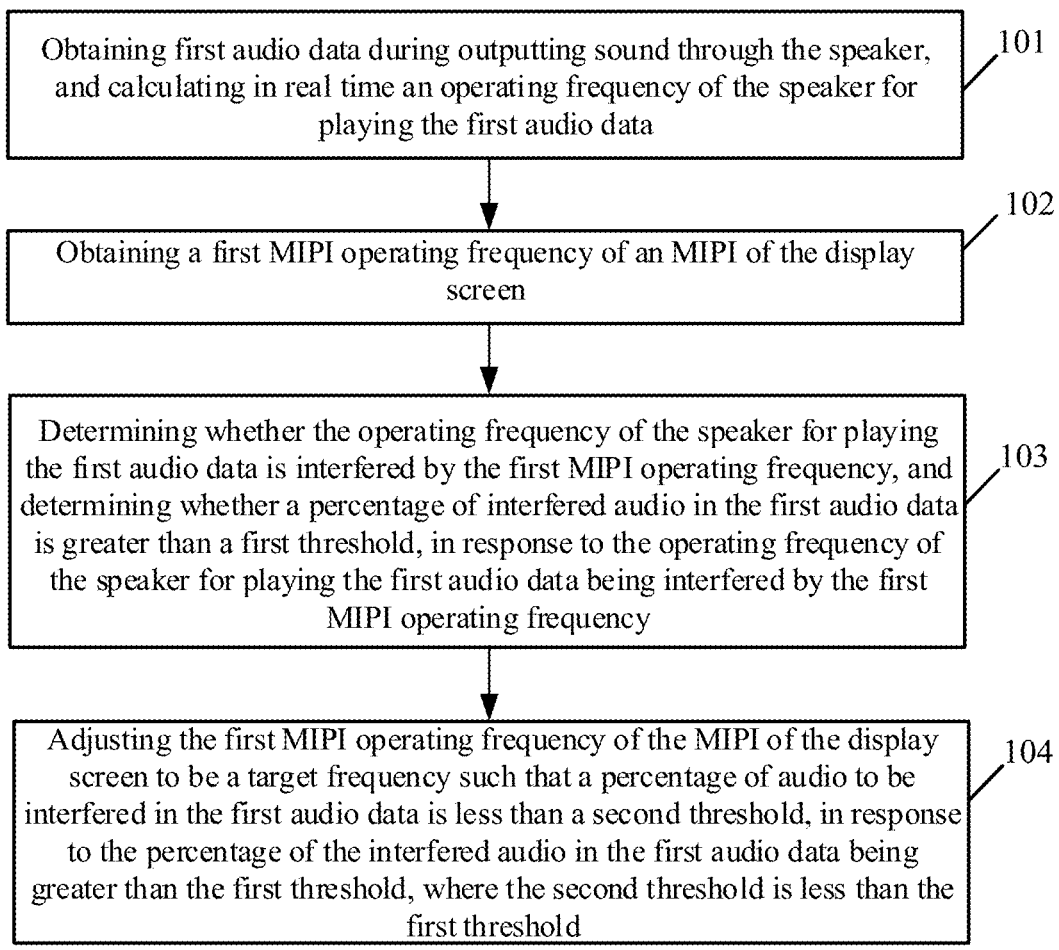
FIG. 1B is a schematic flow chart illustrating a method for controlling display according to implementations of the disclosure.

FIG. 1B is a schematic flow chart illustrating a method for controlling display according to implementations of the disclosure. The method is applicable to the electronic device illustrated in FIG. 1A. The electronic device includes a display screen and a speaker. The method begins at block 101.

At block 101, first audio data is obtained during outputting sound through the speaker, and an operating frequency of the speaker for playing the first audio data is calculated in real time.

The electronic device outputs the sound through the speaker, for example, the electronic device plays an audio file or answers a call through the speaker. During outputting the sound through the speaker, there are high requirements on the clarity and continuity of the sound played by the speaker.

In at least one implementation, the first audio data is obtained as follows. Detect whether the speaker is in a music file-playing state during outputting the sound through the speaker, and a music file is obtained and a part of the music file that is not played is determined to be the first audio data, upon detecting that the speaker is in the state of playing a music file. Alternatively, detect whether the speaker is in a call state during outputting the sound through the speaker, and call voice is collected in real time and is determined as the first audio data, upon detecting that the speaker is in the call state.

In one example, during outputting the sound through the speaker, determine whether the speaker is playing an audio file or answering a call. If it is determined that the speaker is playing an audio file, the audio file being played can be directly obtained, and then a part of the audio file that is not played is determined as the audio to be played. If it is determined that the speaker is answering a call, since during answering the call, it is impossible to predict at which frequency a caller will talk in the future, a historical audio of the caller is collected as the first audio data, and then a percentage of interfered audio in the first audio data is determined. In one example, during collecting the call voice, call voice within a fixed time period starting from a current time point can be sampled at a first time interval to obtain the first audio data. For example, the first time interval is 2 seconds, 3 s, or the like, and the fixed time period can be 20 s, 25 s, and so on. The first time interval may be or may not be a fixed value. When the first time interval is not a fixed value, it indicates that the collected first audio data correspond to multiple sampling frequencies, and thus multiple operating frequencies of the speaker for playing the first audio data may be obtained. Alternatively, the call voice can also be collected according to a second time interval, and all the call voice collected can be determined as the first audio data.

In at least one implementation, the operating frequency of the speaker for playing the first audio data is calculated in real time as follows. A sampling frequency of the first audio data is obtained. The operating frequency of the speaker for playing the first audio data is determined according to the sampling frequency.

Different audio data may correspond to different sampling frequencies. The common sampling frequency of the audio data is 8 kHz, 11.025 kHz, 22.05 kHz, 16 kHz, 37.8 kHz, 44.1 kHz, 48 kHz, or the like. To ensure that the sound is not distorted, the sampling frequency is generally about 40 kHz. During recording sound by the electronic device, analog sound signals are converted into digital signals, whereas during playing audio by the electronic device, the digital signals are converted into analog sound signals for output, and thus the operating frequency of the speaker is determined according to the sampling frequency of the audio data. For example, if a sampling frequency of an audio file is 40 kHz, the operating frequency of the speaker for playing the audio file is also 40 kHz.

At block 102, a first mobile industry processor interface (MIPI) operating frequency of an MIPI of the display screen is obtained.

The MIPI of the display screen can support different operating frequencies (such as 514.5 MHz and 512.5 MHz) or operating frequency bands, which may depend on capabilities of the chip. A crossover frequency or a frequency multiplication of the MIPI operating frequency of the MIPI of the display screen may be equal to the operating frequency of the speaker, thereby causing interference to the speaker. During dynamically adjusting the MIPI operating frequency of the MIPI, it is necessary to repeatedly detect whether the speaker is interfered. As such, the first MIPI operating frequency of the MIPI of the display screen is obtained as follows. An application processor (AP) of the electronic device may first acquire a first MIPI operating frequency before adjusting the MIPI operating frequency of the MIPI of the display screen, and after adjusting the MIPI operating frequency take a target frequency (the manner of determining the target frequency is illustrated in the following) as a new first MIPI operating frequency for subsequent dynamic adjustment of the MIPI operating frequency, that is, in next MIPI operating frequency adjustment, the MIPI operating frequency is adjusted to be the target frequency. Alternatively, the MIPI operating frequency of the MIPI of the display screen is adjusted every a preset time period. That is, the MIPI operating frequency is adjusted every the preset time period. Each time the MIPI operating frequency of the MIPI is adjusted, the AP needs to first acquire a first MIPI operating frequency of the MIPI. In other words, after the MIPI operating frequency of the MIPI of the display screen is adjusted, the AP may obtain another MIPI operating frequency when the preset time period has been elapsed, and then determine whether the other MIPI operating frequency interfere with the operating frequency of the speaker for playing the first audio data.

At block 103, determine whether the operating frequency of the speaker for playing the first audio data is interfered by the first MIPI operating frequency, and determine whether a percentage of interfered audio in the first audio data is greater than a first threshold, when the operating frequency of the speaker for playing the first audio data is interfered by the first MIPI operating frequency.

After the operating frequency of the speaker for playing the first audio data is determined, it is necessary to determine whether the operating frequency of the speaker for playing the first audio data is interfered by the first MIPI operating frequency, so as to adjust the MIPI operating frequency to reduce or eliminate the interference.

In at least one implementation, prior to determining whether the operating frequency of the speaker for playing the first audio data is interfered by the first MIPI operating frequency, the following can be conducted. An operating frequency-interference frequency correspondence table is established. In at least one implementation, the operating frequency-interference frequency correspondence table is established as follows. Multiple MIPI operating frequencies of the MIPI of the display screen are obtained. For each MIPI operating frequency, at least one interference frequency corresponding to the MIPI operating frequency is determined. The operating frequency-interference frequency correspondence table is established for the multiple MIPI operating frequencies according to the at least one interference frequency corresponding to each MIPI operating frequency.

In one example, MIPIs of different electronic devices correspond to different MIPI operating frequencies, and different MIPI operating frequencies correspond to different interference frequencies. In addition, each MIPI operating frequency may correspond to multiple interference frequencies. Therefore, interference frequency lists desense_list_1~desense_list_n corresponding respectively to the MIPI operating frequencies freq_1~freq_n are determined, to establish the operating frequency-interference frequency correspondence table.

In at least one implementation, determine whether the operating frequency of the speaker for playing the first audio data is interfered by the first MIPI operating frequency as follows. Determine whether the operating frequency of the speaker for playing the first audio data matches an interference frequency in the operating frequency-interference frequency correspondence table. If yes, an MIPI operating frequency corresponding to the interference frequency is obtained. Determine whether the MIPI operating frequency corresponding to the interference frequency matches the first MIPI operating frequency. When the MIPI operating frequency corresponding to the interference frequency matches the first MIPI operating frequency, determine that the operating frequency of the speaker for playing the first audio data is interfered by the first MIPI operating frequency.

In one example, after the operating frequency of the speaker for playing the first audio data is determined, the operating frequency of the speaker for playing the first audio data is compared with interference frequencies in the operating frequency-interference frequency correspondence table. If the operating frequency of the speaker for playing the first audio data is equal to interference frequency A or is in a preset range of interference frequency A, it is determined that the operating frequency of the speaker for playing the first audio data matches interference frequency A in the operating frequency-interference frequency correspondence table. Thereafter, MIPI operating frequency A' corresponding to interference frequency A is obtained and compared with the first MIPI operating frequency. Since the first MIPI operating frequency is a definite value, when the first MIPI operating frequency is exactly equal to MIPI operating frequency A' corresponding to interference frequency A, it is determined that the MIPI operating frequency corresponding to the interference frequency matches the first MIPI operating frequency, and the operating frequency of the speaker for playing the first audio data is interfered by the first MIPI operating frequency. In addition, if no MIPI operating frequency in the operating frequency-interference frequency correspondence table is exactly equal to the first MIPI operating frequency, it can be set that an MIPI operating frequency in the operating frequency-interference frequency correspondence table matches the first MIPI operating frequency, where a difference between the first MIPI operating frequency and the MIPI operating frequency is smaller than that between the first MIPI operating frequency and any one of MIPI operating frequencies excluding the MIPI operating frequency in the operating frequency-interference frequency correspondence table. Alternatively, if a difference between an MIPI operating frequency in the operating frequency-interference frequency correspondence table and the first MIPI operating frequency is less than a frequency threshold, determine that the MIPI operating frequency matches the first MIPI operating frequency.

In at least one implementation, the percentage of the interfered audio in the first audio data is determined as follows. The first audio data is divided into multiple audio units according to a sampling period(s) corresponding to a sampling frequency(es). For each audio unit, if an operating frequency of the speaker for playing the audio unit is interfered by the first MIPI operating frequency, it is determined that the audio unit is interfered by the first MIPI operating frequency. In one example, if the first audio data is divided into N audio units, and M audio units are interfered, the percentage P of the interfered audio in the first audio data is calculated as follows: $P=M/N*100\%$. Alternatively, the first audio data can also be divided into R periodic audio blocks according to period T. For each periodic audio block, the periodic audio block can be divided into multiple audio units according to a sampling period(s) corresponding to a sampling frequency(es), and then determine whether the periodic audio block is interfered by determining whether a percentage of interfered audio units in the periodic audio block is greater than a third threshold. If the percentage of interfered audio units in the periodic audio block is greater than the third threshold, determine that the periodic audio block is interfered by the first MIPI operating frequency. Otherwise, determine that the periodic audio block is not interfered by the first MIPI operating frequency. The third threshold may be equal to or may be not equal to the first threshold. In one example, if S periodic audio blocks are interfered by the first MIPI operating frequency, the percentage P of the interfered audio in the first audio data is calculated as follows: $P=S/R*100\%$. When the percentage of the interfered audio in the first audio data is greater than the first threshold, it indicates that the first audio data is interfered by the first MIPI operating frequency to a great extent, and the play effect of the speaker is poor. Therefore, it is necessary to adjust the MIPI operating frequency of the MIPI of the display screen. In one example, the first threshold is a percentage number, or a decimal value ranging from 0 to 1.

According to implementations of the disclosure, the first MIPI operating frequency of the MIPI of the display screen and the operating frequency of the speaker for playing the first audio data are obtained. The operating frequency of the speaker for playing the first audio data is compared with the interference frequencies in the operating frequency-interference frequency correspondence table, to determine whether the operating frequency of the speaker for playing the first audio data is within an interference range of the first MIPI operating frequency. If there is an interference frequency equal to the operating frequency of the speaker for playing the first audio data, and an MIPI operating frequency corresponding to the interference frequency is equal to the first MIPI operating frequency, determine that the operating frequency of the speaker for playing the first audio data falls within the range of the first MIPI operating frequency. If the percentage of the interfered audio in the first audio data is greater than the first threshold, the first MIPI operating frequency of the MIPI of the display screen is adjusted. By comparing the operating frequency of the speaker for playing the first audio data with the interference frequencies in the operating frequency-interference frequency correspondence table, the interference of the MIPI operating frequency of the MIPI of the display screen to the speaker can be determined and improved, thereby ensuring the effectiveness of the adjustment of the MIPI operating frequency of the MIPI of the display screen and improving the processing efficiency.

At block 104, the first MIPI operating frequency of the MIPI of the display screen is adjusted to be a target frequency such that a percentage of audio to be interfered in the first audio data is less than a second threshold, when the percentage of the interfered audio in the first audio data is greater than the first threshold, where the second threshold is less than the first threshold.

In one example, after it is determined that the percentage of the interfered audio in the first audio data is greater than the first threshold, the MIPI operating frequency of the MIPI of the display screen needs to be adjusted to be the target frequency, to reduce or eliminate the interference of the MIPI operating frequency of the MIPI of the display screen to the speaker.

In at least one implementation, the electronic device adjusts the first MIPI operating frequency of the MIPI of the display screen to be the target frequency as follows. The electronic device obtains a pre-configured target value of a screen parameter associated with the target frequency, where the target value is associated with a reference value, the reference value is determined according to a preset frame-rate calculation formula and the target frequency when the electronic device is under a first constraint condition, and the first constraint condition is that the amount of change in a frame rate of the display screen after MIPI operating frequency switch is less than a fourth threshold. The screen parameter includes at least one of following porch parameters in the preset frame-rate calculation formula: a horizontal back porch (HBP), a horizontal front porch (HFP), a vertical back porch (VBP), a vertical front porch (VFP), a vertical sync active (VSA), or a horizontal sync active (HSA). Thereafter, a value of the screen parameter is adjusted to be the target value, and the first MIPI operating frequency of the MIPI of the display screen is adjusted to be the target frequency.

In one example, the target frequency is determined according to the operating frequency of the speaker for playing the first audio data. For example, for each MIPI operating frequency in the operating frequency-interference frequency correspondence table, determine whether the operating frequency of the speaker for playing the first audio data is interfered by the MIPI operating frequency; if yes, determine an interfered-audio percentage corresponding to the MIPI operating frequency. Thereafter, determine an MIPI operating frequency in the operating frequency-interference frequency correspondence table as the target frequency according to the interfered-audio percentage corresponding to each MIPI operating frequency, where the MIPI operating frequency corresponds to the smallest interfered-audio percentage, that is, the target frequency has no interference or has the weakest interference to the operating frequency of the speaker for playing the first audio data.

The preset frame-rate calculation formula is as follows: FPS=CLK_rate*2*lane_num/((height+VBP+VSA+VFP)* (weight+HBP+HFP+HSA)*bits_perpixel), where FPS (frames per second) represents a frame rate of the display screen, CLK_rate represents an MIPI frequency, Lane_num represents the number of channels, and height and weight represent sizes of the display screen. VBP represents the number of inactive lines between (the finishing of) the vertical synchronization signal and the beginning of a next frame of image (the first valid line). VFP represents the number of inactive lines between the finishing of the frame of image (the last valid line of the frame) and (the starting of) the next vertical synchronization signal. VSA represents the width of the vertical synchronization signal, i.e., the number of vertical synchronization signal pulses when a vertical synchronization signal is active. HBP represents the number of clocks between (the beginning of) the horizontal synchronization signal and the beginning of one line of valid data (the first valid pixel data). HFP represents the number of clocks between the end of one line of valid data (the last valid pixel data in the line) and (the beginning of) the next horizontal synchronization signal. HSA represents the width of the horizontal synchronization signal, i.e., the number of pixel clocks when a horizontal synchronization signal is active, and bits_perpixel represents the width of displayed RGB data.

The fourth threshold is obtained according to experience. Setting the fourth threshold can ensure the stability of content displayed on the display screen after frequency switching. For example, the fourth threshold is 1% which is a maximum allowable error range of the chip of the display screen.

In one example, after frequency-hopping switch, a value (s) of a parameter(s) of the display screen of the electronic device may be changed. The frame rate is a parameter index for measuring display stability of the display screen after frequency-hopping switching. Therefore, according to the frame-rate calculation formula, the electronic device can pre-determine the target value of the screen parameter that needs to be synchronously adjusted during frequency hopping, to improve the display stability of the display screen.

In at least one implementation, the screen parameter includes a horizontal screen parameter. The horizontal screen parameter includes at least one of following parameters: the HBP, the HFP, or the HSA.

The target value is determined by adjusting the reference value when the electronic device is under a second constraint condition, where the second constraint condition is that the amount of change in a line-scan duration of the display screen after the MIPI operating frequency switch is less than a fifth threshold.

For example, in condition that the main frequency of the MIPI of the display screen is 514.5 MHz, the line-scan duration measured is 7.18 μs. When the frequency of the MIPI is switched from 514.5 MHz to a secondary frequency (or a target frequency) of 529 MHz, the value of the screen parameter is finely adjusted according to the reference value, and the line-scan duration is synchronously measured. Thereafter, when the line-scan duration reaches 7.18 μs, a value of the screen parameter obtained by finely adjusting the reference value is determined as the target value. The reason is that the above frame-rate calculation formula is merely a theoretical calculation formula. In fact, due to the structural differences of devices, the reference value is not very accurate, and the MIPI frequency and the value of the screen parameter are quite different (difference in MHz, tens of MHz, or hundreds of MHz). In addition, the horizontal screen parameter has a great influence on the display stability of the display screen. Therefore, the value of the horizontal screen parameter is corrected according to the actual detection result to improve the display stability of the display screen.

In other implementations, if the screen parameter merely includes a vertical screen parameter, the vertical screen parameter includes at least one of following porch parameters: the VBP, the VFP, or the VAS. The target value may be equal to the reference value. That is, adjustment of a value of a vertical porch parameter has no influence on the line-scan duration.

As can be seen, in case that the screen parameter includes the horizontal screen parameter, the electronic device can correct the reference value according to the constraint condition of the line-scan duration in conjunction with the actual detection result, such that the display stability of the display screen after frequency hopping can be improved.

After the first MIPI operating frequency of the MIPI of the display screen is adjusted to be the target frequency, the percentage of the audio to be interfered in the first audio data is less than the second threshold, where the second threshold is less than the first threshold. The second threshold can be determined according to historical experience. Alternatively, the second threshold is determined as follows. An interfered-audio percentage corresponding to each MIPI operating frequency in the operating frequency-interference frequency correspondence table is calculated to obtain multiple interfered-audio percentages, and the minimum interfered-audio percentage is selected from the multiple interfered-audio percentages as the second threshold.

According to the method for controlling display provided herein, during outputting the sound through the speaker, the first audio data is obtained and the operating frequency of the speaker for playing the first audio data is calculated in real time. The first MIPI operating frequency of the MIPI of the display screen is obtained. Determine whether the operating frequency of the speaker for playing the first audio data is interfered by the first MIPI operating frequency, and determine whether the percentage of the interfered audio in the first audio data is greater than the first threshold when the operating frequency of the speaker for playing the first audio data is interfered by the first MIPI operating frequency. If the percentage of the interfered audio in the first audio data is greater than the first threshold, the first MIPI operating frequency of the MIPI of the display screen is adjusted to be the target frequency such that the percentage of the audio to be interfered in the first audio data is less than the second threshold. The second threshold is less than the first threshold. In this way, it is possible to dynamically adjust the MIPI operating frequency of the MIPI of the display screen without changing the hardware design of the electronic device in a scenario where the electronic device plays audio through the speaker, such that the electromagnetic interference of the MIPI operating frequency of the MIPI to the speaker can be eliminated or reduced to obtain good play performance.

Figure 2:
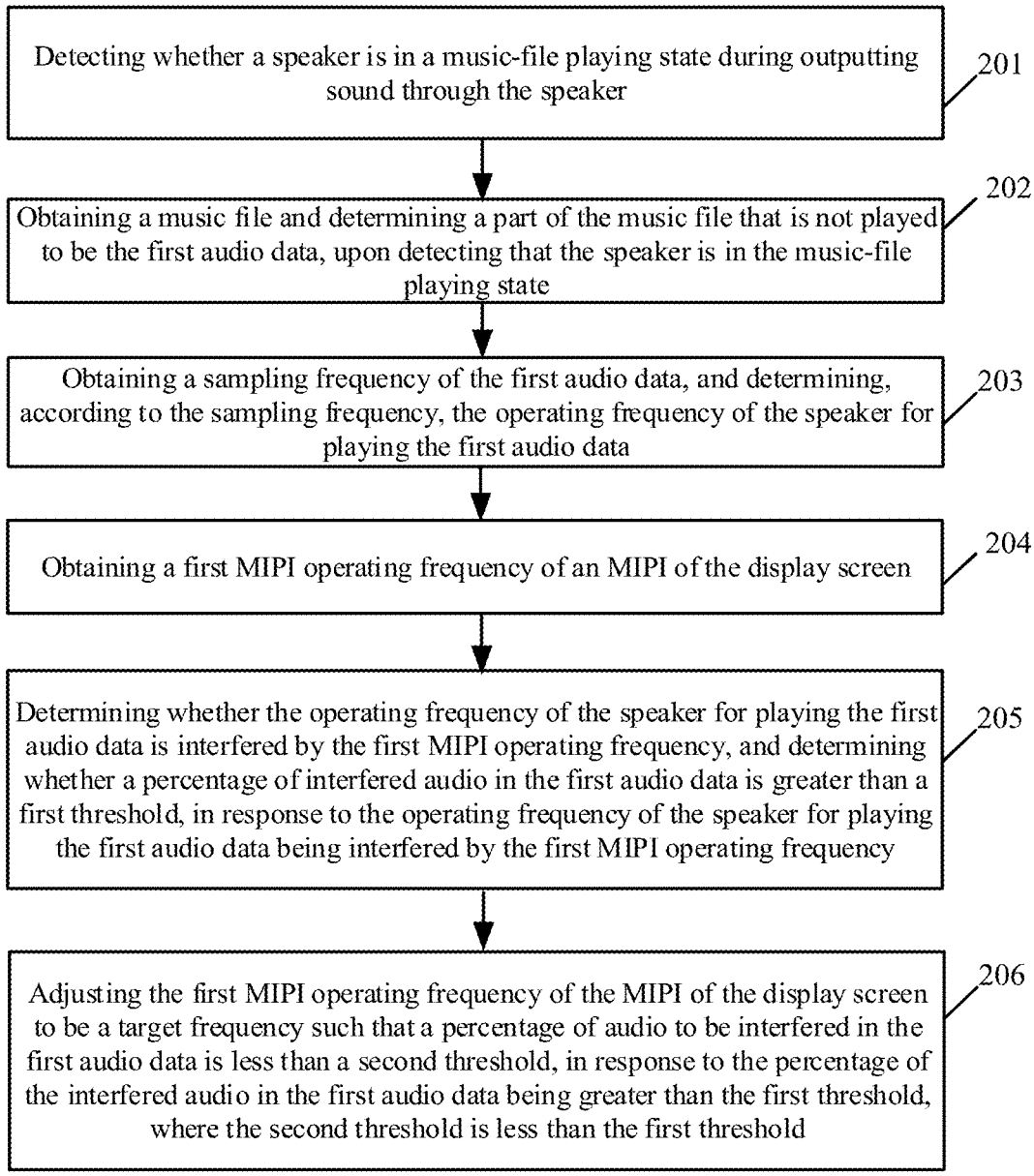
FIG. 2 is a schematic flow chart illustrating a method for controlling display according to other implementations of the disclosure.

Similar to the implementations illustrated in FIG. 1B, FIG. 2 is a schematic flow chart illustrating a method for controlling display according to other implementations of the disclosure. The method is applicable to the electronic device in FIG. 1A. The electronic device includes a display screen and a speaker. The method begins at block 201.

At block 201, detect whether the speaker is in a music-file playing state during outputting sound through the speaker.

At block 202, a music file is obtained and a part of the music file that is not played is determined to be the first audio data, upon detecting that the speaker is in the music-file playing state.

At block 203, a sampling frequency of the first audio data is obtained, and the operating frequency of the speaker for playing the first audio data is determined according to the sampling frequency.

At block 204, a first MIPI operating frequency of an MIPI of the display screen is obtained.

At block 205, determine whether the operating frequency of the speaker for playing the first audio data is interfered by the first MIPI operating frequency, and determine whether a percentage of interfered audio in the first audio data is greater than a first threshold when the operating frequency of the speaker for playing the first audio data is interfered by the first MIPI operating frequency.

At block 206, the first MIPI operating frequency of the MIPI of the display screen is adjusted to be a target frequency such that a percentage of audio to be interfered in the first audio data is less than a second threshold, when the percentage of the interfered audio in the first audio data is greater than the first threshold, where the second threshold is less than the first threshold.

For the detailed description of the above operations at block 201 to 206, reference may be made to the corresponding description of the method for controlling display described in FIG. 1B, which will not be repeated herein.

As can be seen, in the method for controlling display, during outputting the sound through the speaker, the part of the music file that is not played is determined to be the first audio data, and the operating frequency of the speaker for playing the first audio data is determined according to the sampling frequency. The first MIPI operating frequency of the MIPI of the display screen is obtained to determine whether the MIPI operating frequency of the MIPI of the display screen needs to be adjusted. In this way, it is possible to dynamically adjust the MIPI operating frequency of the MIPI of the display screen without changing the hardware design of the electronic device in a scenario where the electronic device plays audio through the speaker, such that the electromagnetic interference of the MIPI operating frequency of the MIPI to the speaker can be eliminated or reduced to obtain good play performance.

Figure 3:
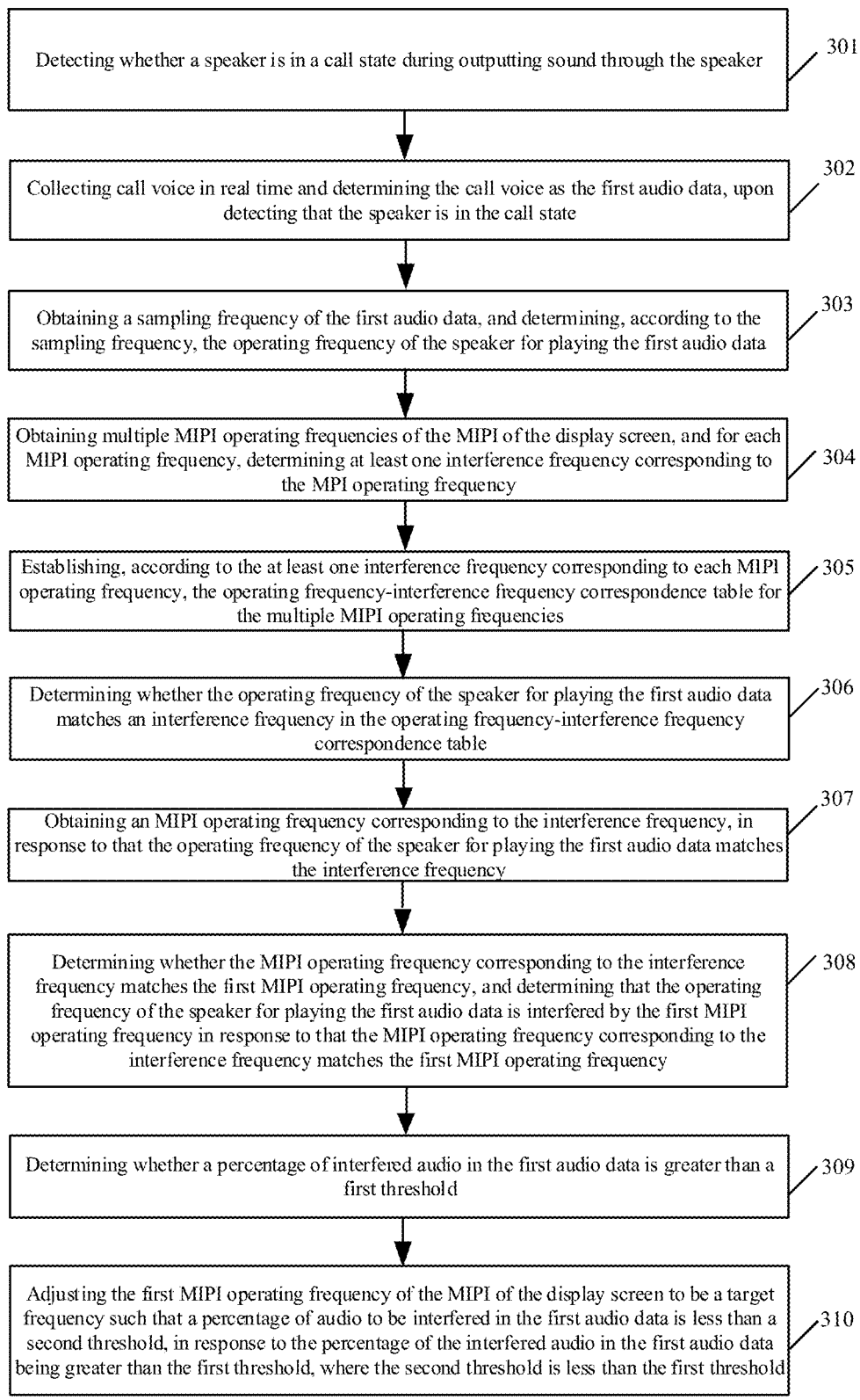
FIG. 3 is a schematic flow chart illustrating a method for controlling display according to other implementations of the disclosure.

Similar to the foregoing method, FIG. 3 is a schematic flow chart illustrating a method for controlling display according to other implementations of the disclosure. The method is applicable to the electronic device illustrated in FIG. 1A, and the electronic device includes a display screen and a speaker. The method begins at block 301.

At block 301, detect whether the speaker is in a call state during outputting sound through the speaker.

At block 302, call voice is collected in real time and is determined as the first audio data, upon detecting that the speaker is in the call state.

At block 303, a sampling frequency of the first audio data is obtained, and the operating frequency of the speaker for playing the first audio data is determined according to the sampling frequency.

At block 304, multiple MIPI operating frequencies of the MIPI of the display screen are obtained, and for each MIPI operating frequency, at least one interference frequency corresponding to the MIPI operating frequency is determined.

At block 305, an operating frequency-interference frequency correspondence table is established for the multiple MIPI operating frequencies according to the at least one interference frequency corresponding to each MIPI operating frequency.

At block 306, determine whether the operating frequency of the speaker for playing the first audio data matches an interference frequency in the operating frequency-interference frequency correspondence table.

At block 307, an MIPI operating frequency corresponding to the interference frequency is obtained, when the operating frequency of the speaker for playing the first audio data matches the interference frequency.

At block 308, determine whether the MIPI operating frequency corresponding to the interference frequency matches the first MIPI operating frequency, and determine that the operating frequency of the speaker for playing the first audio data is interfered by the first MIPI operating frequency when the MIPI operating frequency corresponding to the interference frequency matches the first MIPI operating frequency.

At block 309, determine whether a percentage of interfered audio in the first audio data is greater than a first threshold.

At block 310, the first MIPI operating frequency of the MIPI of the display screen is adjusted to be a target frequency such that a percentage of audio to be interfered in the first audio data is less than a second threshold, when the percentage of the interfered audio in the first audio data is greater than the first threshold, where the second threshold is less than the first threshold.

For the detailed description of the above operations at block 301 to 310, reference may be made to the corresponding description of the method for controlling display described in FIG. 1B, which will not be repeated herein.

As can be seen, in the method for controlling display, during outputting the sound through the speaker, the call voice is collected and determined to be the first audio data, and the operating frequency of the speaker for playing the first audio data is determined according to the sampling frequency. The first MIPI operating frequency of the MIPI of the display screen is obtained. According to the MIPI operating frequency of the MIPI of the display screen and the interference frequency corresponding to each MIPI operating frequency, the operating frequency-interference frequency correspondence table is established, to determine whether the operating frequency of the speaker is within an interference range of the first MIPI operating frequency. If yes, the MIPI operating frequency of the MIPI of the display screen is adjusted. In this way, it is possible to dynamically adjust the MIPI operating frequency of the MIPI of the display screen without changing the hardware design of the electronic device in a scenario where the electronic device plays audio through the speaker, such that the electromagnetic interference of the MIPI operating frequency of the MIPI to the speaker can be eliminated or reduced to obtain good play performance.

Figure 4:
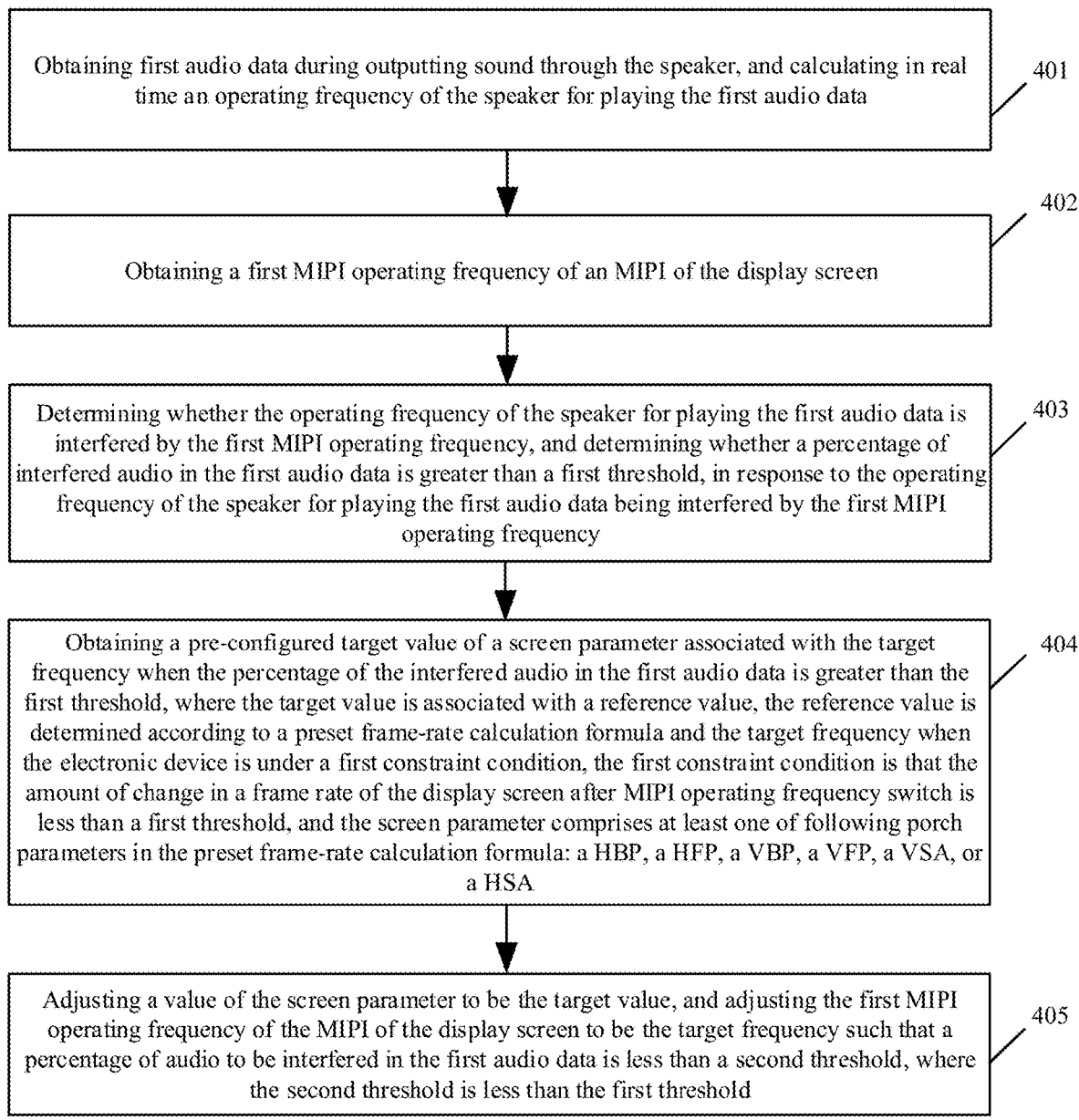
FIG. 4 is a schematic flow chart illustrating a method for controlling display according to other implementations of the disclosure.

FIG. 4 is a schematic flow chart illustrating a method for controlling display according to other implementations of the disclosure. As illustrated in FIG. 4, the method for controlling display is applicable to an electronic device illustrated in FIG. 1A. The electronic device includes a display screen and a speaker. The method begins at block 401.

At block 401, first audio data is obtained during outputting sound through the speaker of the electronic device, and an operating frequency of the speaker for playing the first audio data is calculated in real time.

At block 402, a first MIPI operating frequency of an MIPI of the display screen is obtained.

At block 403, determine whether the operating frequency of the speaker for playing the first audio data is interfered by the first MIPI operating frequency, and determine whether a percentage of interfered audio in the first audio data is greater than a first threshold when the operating frequency of the speaker for playing the first audio data is interfered by the first MIPI operating frequency.

At block 404, when the percentage of the interfered audio in the first audio data being greater than the first threshold, a pre-configured target value of a screen parameter associated with the target frequency is obtained, where the target value is associated with a reference value, the reference value is determined according to a preset frame-rate calculation formula and the target frequency when the electronic device is under a first constraint condition, the first constraint condition is that the amount of change in a frame rate of the display screen after MIPI operating frequency switch is less than a first threshold, and the screen parameter includes at least one of following porch parameters in the preset frame-rate calculation formula: a HBP, a HFP, a VBP, a VFP, a VSA, or a HSA.

At block 405, a value of the screen parameter is adjusted to be the target value, and the first MIPI operating frequency of the MIPI of the display screen is adjusted to be the target frequency, where the second threshold is less than the first threshold.

According to the method for controlling display provided herein, during outputting the sound through the speaker, the first audio data is obtained and the operating frequency of the speaker for playing the first audio data is calculated in real time. The first MIPI operating frequency of the MIPI of the display screen is obtained. Determine whether the operating frequency of the speaker for playing the first audio data is interfered by the first MIPI operating frequency, and determine whether the percentage of the interfered audio in the first audio data is greater than the first threshold, when the operating frequency of the speaker for playing the first audio data is interfered by the first MIPI operating frequency. If the percentage of the interfered audio in the first audio data is greater than the first threshold, the first MIPI operating frequency of the MIPI of the display screen is adjusted to be the target frequency such that the percentage of the audio to be interfered in the first audio data is less than the second threshold. The second threshold is less than the first threshold. In this way, it is possible to dynamically adjust the MIPI operating frequency of the MIPI of the display screen without changing the hardware design of the electronic device in a scenario where the electronic device plays audio through the speaker, such that the electromagnetic interference of the MIPI operating frequency of the MIPI to the speaker can be thereby eliminated or reduced to obtain good play performance.

Figure 5:
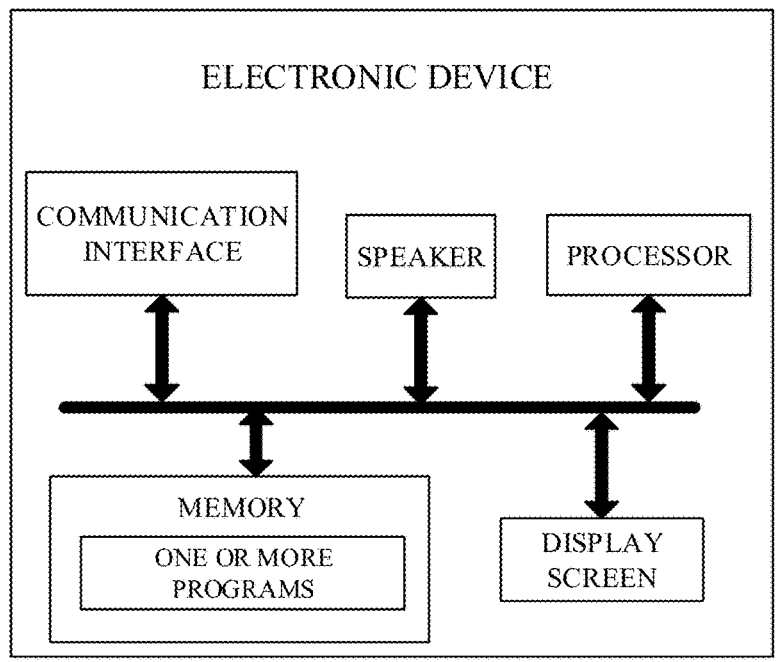
FIG. 5 is a schematic structural diagram illustrating an electronic device according to other implementations of the disclosure.

FIG. 5 is schematic structural diagram illustrating an electronic device according to other implementations of the disclosure. As illustrated in FIG. 5, the electronic device includes a processor, a memory, a display screen, and a speaker, and a communication interface, and one or more programs. The one or more programs are stored in the memory and configured to be performed by the processor. The one or more programs include instructions for performing the following operations. First audio data is obtained during outputting sound through the speaker of the electronic device, and an operating frequency of the speaker for playing the first audio data is calculated in real time. A first MIPI operating frequency of an MIPI of the display screen is obtained. Determine whether the operating frequency of the speaker for playing the first audio data is interfered by the first MIPI operating frequency, and determine whether a percentage of interfered audio in the first audio data is greater than a first threshold, when the operating frequency of the speaker for playing the first audio data is interfered by the first MIPI operating frequency. The first MIPI operating frequency of the MIPI of the display screen is adjusted to be a target frequency such that a percentage of audio to be interfered in the first audio data is less than a second threshold, when the percentage of the interfered audio in the first audio data is greater than the first threshold, where the second threshold is less than the first threshold.

In one example, in terms of obtaining the first audio data, instructions of the one or more programs are configured to: detect whether the speaker is in a music-file playing state during outputting the sound through the speaker, and obtain a music file and determine a part of the music file that is not played to be the first audio data, upon detecting that the speaker is in the music-file playing state; or detect whether the speaker is in a call state during outputting the sound through the speaker, and collect call voice in real time and determine the call voice as the first audio data, upon detecting that the speaker is in the call state.

In one example, in terms of calculating in real time the operating frequency of the speaker for playing the first audio data, instructions of the one or more programs are configured to: obtaining a sampling frequency of the first audio data; determining, according to the sampling frequency, the operating frequency of the speaker for playing the first audio data.

In one example, instructions of the one or more programs are further configured to: establishing an operating frequency-interference frequency correspondence table, prior to determining whether the operating frequency of the speaker for playing the first audio data is interfered by the first MIPI operating frequency. In terms of establishing the operating frequency-interference frequency correspondence table, instructions of the one or more programs are configured to: obtain multiple MIPI operating frequencies of the MIPI of the display screen; for each MIPI operating frequency, determine at least one interference frequency corresponding to the MIPI operating frequency; establish, according to the at least one interference frequency corresponding to each MIPI operating frequency, the operating frequency-interference frequency correspondence table for the multiple MIPI operating frequencies.

In one example, in terms of determining whether the operating frequency of the speaker for playing the first audio data is interfered by the first MIPI operating frequency, instructions of the one or more programs are configured to: determine whether the operating frequency of the speaker for playing the first audio data matches an interference frequency in the operating frequency-interference frequency correspondence table; obtain an MIPI operating frequency corresponding to the interference frequency, in response to that the operating frequency of the speaker for playing the first audio data matches the interference frequency; determine whether the MIPI operating frequency corresponding to the interference frequency matches the first MIPI operating frequency; determine that the operating frequency of the speaker for playing the first audio data is interfered by the first MIPI operating frequency, when the MIPI operating frequency corresponding to the interference frequency matches the first MIPI operating frequency.

In one example, prior to determining whether the percentage of the interfered audio in the first audio data is greater than the first threshold, instructions of the one or more programs are further configured to: divide, according to a preset period, the first audio data into R periodic audio blocks, R being an integer greater than 0; perform an interference judgment operation on each of the R periodic audio blocks to determine, from the R periodic audio blocks, S periodic audio blocks interfered by the first MIPI operating frequency, S being an integer greater than 0 and not greater than R; calculate the percentage of the interfered audio in the first audio data according to the R periodic audio blocks and the S periodic audio blocks interfered by the first MIPI operating frequency.

In one example, in terms of performing the interference judgment operation on each of the R periodic audio blocks, instructions of the one or more programs are configured to: obtain at least one sampling period corresponding to the periodic audio block, and divide, according to the at least one sampling period, the periodic audio block into multiple audio units; determine, from the multiple audio units, the number of audio units that are interfered by the first MIPI operating frequency, and calculate, according to the number of the audio units that are interfered by the first MIPI operating frequency and the total number of the multiple audio units, a percentage of the interfered audio units in the multiple audio units; determine whether the percentage of the interfered audio units in the multiple audio units is greater than a third threshold; determine that the periodic audio block is interfered by the first MIPI operating frequency in response to that the percentage of the interfered audio units in the multiple audio units is greater than the third threshold.

In one example, in terms of adjusting the first MIPI operating frequency of the MIPI of the display screen to be the target frequency, instructions of the one or more programs are configured to: obtain a pre-configured target value of a screen parameter associated with the target frequency, where the target value is associated with a reference value, the reference value is determined according to a preset frame-rate calculation formula and the target frequency when the electronic device is under a first constraint condition, and the first constraint condition is that the amount of change in a frame rate of the display screen after MIPI operating frequency switch is less than a fourth threshold, where the screen parameter includes at least one of following porch parameters in the preset frame-rate calculation formula: a HBP, a HFP, a VBP, a VFP, a VSA, or a HSA; adjust a value of the screen parameter to be the target value, and adjust the first MIPI operating frequency of the MIPI of the display screen to be the target frequency.

In one example, the screen parameter includes a horizontal screen parameter. The horizontal screen parameter includes at least one of following parameters: the HBP, the HFP, or the HSA. The target value is determined by adjusting the reference value when the electronic device is under a second constraint condition, where the second constraint condition is that the amount of change in a line-scan duration of the display screen after the MIPI operating frequency switch is less than a fifth threshold.

The foregoing implementations mainly introduce the solution of the implementation of the disclosure from the perspective of performing the process on the method side. It can be understood that the electronic device includes corresponding hardware structures and/or software modules for performing the respective functions in order to implement the above functions. Those skilled in the art will readily appreciate that the disclosure can be implemented in hardware or a combination of hardware and computer software in combination with the elements and algorithm steps of the various examples described in the implementations disclosed herein. Whether a function is implemented in hardware or computer software to drive hardware depends on the specific application and design constraints of the solution. A person skilled in the art can use different methods for each particular application to implement the described functionality, but such implementation should not be considered to be beyond the scope of the disclosure.

In the implementations of the disclosure, the electronic device may be divided into functional unit according to the method implementations. For example, the functional units may be divided according to various functions, or two or more functions may be integrated into one processing unit. The integrated unit can be implemented in the form of hardware or in the form of a software functional unit. It should be noted that the unit division in the implementation of the disclosure is illustrative and only a logical function division, and there can be other manners of division during actual implementations.

Figure 6:
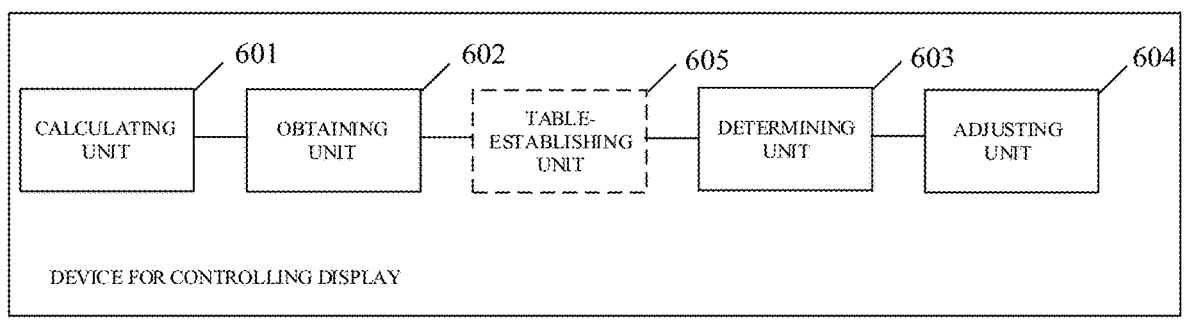
FIG. 6 is a schematic structural diagram illustrating a device for controlling display according to implementations of the disclosure.

FIG. 6 is a schematic structural diagram illustrating a device for controlling display according to implementations of the disclosure. The device is applicable to the electronic device illustrated in FIG. 1A. The electronic device includes a display screen and a speaker. As illustrated in FIG. 6, the device includes a calculating unit 601, an obtaining unit 602, a determining unit 603, and an adjusting unit 604. The calculating unit 601 is configured to obtain first audio data during outputting sound through the speaker of the electronic device, and calculate in real time an operating frequency of the speaker for playing the first audio data. The obtaining unit 602 is configured to obtain a first MIPI operating frequency of an MIPI of the display screen. The determining unit 603 is configured to determine whether the operating frequency of the speaker for playing the first audio data is interfered by the first MIPI operating frequency, and determine whether a percentage of interfered audio in the first audio data is greater than a first threshold, when the operating frequency of the speaker for playing the first audio data is interfered by the first MIPI operating frequency. The adjusting unit 604 is configured to adjust the first MIPI operating frequency of the MIPI of the display screen to be a target frequency such that a percentage of audio to be interfered in the first audio data is less than a second threshold, when the determining unit 603 determines that the percentage of the interfered audio in the first audio data is greater than the first threshold, where the second threshold is less than the first threshold.

In at least one implementation, the calculating unit 601 configured to obtain the first audio data is configured to: detect whether the speaker is in a music-file playing state during outputting the sound through the speaker, and obtain a music file and determine a part of the music file that is not played to be the first audio data, upon detecting that the speaker is in the music-file playing state; or detect whether the speaker is in a call state during outputting the sound through the speaker, and collect call voice in real time and determine the call voice as the first audio data, upon detecting that the speaker is in the call state.

In at least one implementation, the calculating unit 601 configured to calculate in real time the operating frequency of the speaker for playing the first audio data is configured to: obtain a sampling frequency of the first audio data; determine, according to the sampling frequency, the operating frequency of the speaker for playing the first audio data.

In at least one implementation, the device further includes a table-establishing unit 605. The table-establishing unit 605 is configured to establish an operating frequency-interference frequency correspondence table, prior to determining whether the operating frequency of the speaker for playing the first audio data is interfered by the first MIPI operating frequency. The table-establishing unit 605 configured to establish the operating frequency-interference frequency correspondence table is configured to: obtain multiple MIPI operating frequencies of the MIPI of the display screen; determine, for each MIPI operating frequency, at least one interference frequency corresponding to the MIPI operating frequency; establish, according to the at least one interference frequency corresponding to each MIPI operating frequency, the operating frequency-interference frequency correspondence table for the multiple MIPI operating frequencies.

In at least one implementation, the determining unit 603 configured to determine whether the operating frequency of the speaker for playing the first audio data is interfered by the first MIPI operating frequency is configured to: determine whether the operating frequency of the speaker for playing the first audio data matches an interference frequency in the operating frequency-interference frequency correspondence table; obtain an MIPI operating frequency corresponding to the interference frequency, when that the operating frequency of the speaker for playing the first audio data matches the interference frequency; determine whether the MIPI operating frequency corresponding to the interference frequency matches the first MIPI operating frequency; determine that the operating frequency of the speaker for playing the first audio data is interfered by the first MIPI operating frequency, when the MIPI operating frequency corresponding to the interference frequency matches the first MIPI operating frequency.

In one example, prior to determining whether the percentage of the interfered audio in the first audio data is greater than the first threshold, the determining unit 603 is further configured to: divide, according to a preset period, the first audio data into R periodic audio blocks, R being an integer greater than 0; perform an interference judgment operation on each of the R periodic audio blocks to determine, from the R periodic audio blocks, S periodic audio blocks interfered by the first MIPI operating frequency, S being an integer greater than 0 and not greater than R; calculate the percentage of the interfered audio in the first audio data according to the R periodic audio blocks and the S periodic audio blocks interfered by the first MIPI operating frequency.

In one example, the determining unit 603 configure to perform the interference judgment operation on each of the R periodic audio blocks is configured to: obtain at least one sampling period corresponding to the periodic audio block, and divide, according to the at least one sampling period, the periodic audio block into a plurality of audio units; determine, from the plurality of audio units, the number of audio units that are interfered by the first MIPI operating frequency, and calculate, according to the number of the audio units that are interfered by the first MIPI operating frequency and the total number of the plurality of audio units, a percentage of the interfered audio units in the plurality of audio units; determine whether the percentage of the interfered audio units in the plurality of audio units is greater than a third threshold; determine that the periodic audio block is interfered by the first MIPI operating frequency in response to that the percentage of the interfered audio units in the plurality of audio units is greater than the third threshold.

In at least one implementation, the adjusting unit 604 configured to adjust the first MIPI operating frequency of the MIPI of the display screen to be the target frequency is configured to: obtain a pre-configured target value of a screen parameter associated with the target frequency, where the target value is associated with a reference value, the reference value is determined according to a preset frame-rate calculation formula and the target frequency when the electronic device is under a first constraint condition, the first constraint condition is that the amount of change in a frame rate of the display screen after MIPI operating frequency switch is less than a fourth threshold, and the screen parameter comprises at least one of following porch parameters in the preset frame-rate calculation formula: a HBP, a HFP, a VBP, a VFP, a VSA, or a HSA; adjust a value of the screen parameter to be the target value, and adjusting the first MIPI operating frequency of the MIPI of the display screen to be the target frequency.

In at least one implementation, the screen parameter includes a horizontal screen parameter. The horizontal screen parameter includes at least one of following parameters: the HBP, the HFP, or the HSA. The target value is determined by adjusting the reference value when the electronic device is under a second constraint condition, where the second constraint condition is that the amount of change in a line-scan duration of the display screen after the MIPI operating frequency switch is less than a fifth threshold.

According to the device for controlling display provided herein, during outputting the sound through the speaker, the first audio data is obtained and the operating frequency of the speaker for playing the first audio data is calculated in real time. The first MIPI operating frequency of the MIPI of the display screen is obtained. Determine whether the operating frequency of the speaker for playing the first audio data is interfered by the first MIPI operating frequency, and determine whether the percentage of the interfered audio in the first audio data is greater than the first threshold, when the operating frequency of the speaker for playing the first audio data is interfered by the first MIPI operating frequency. If the percentage of the interfered audio in the first audio data is greater than the first threshold, the first MIPI operating frequency of the MIPI of the display screen is adjusted to be the target frequency such that the percentage of the audio to be interfered in the first audio data is less than the second threshold. The second threshold is less than the first threshold. In this way, it is possible to dynamically adjust the MIPI operating frequency of the MIPI of the display screen without changing the hardware design of the electronic device in a scenario where the electronic device plays audio through the speaker, thereby eliminating or reducing the electromagnetic interference of the MIPI operating frequency of the MIPI to the speaker to obtain good play performance.

It should be noted that the electronic device described in the implementations of the disclosure is presented in the form of functional units. The term "unit" used herein should be understood as the broadest possible meaning. The object used to realize the functions described by each "unit" may be, for example, an ASIC, a single circuit, a processor (such as a shared processor, a specific processor, or chipset) used to execute one or more software or firmware program, memory, a combined logic circuit, and/or other suitable components that provide the functions described above.

Implementations of the disclosure also provide a non-transitory computer readable storage medium. The non-transitory computer readable storage medium stores computer programs which, when executed, are operable with a computer to perform all or part of the operations of any of the methods for controlling display described in the above-described method implementations.

Implementations of the disclosure also provide a computer program product. The computer program product includes a non-transitory computer readable storage medium storing computer programs. The computer programs are operable with a computer to perform all or part of the operations of any of the methods for controlling display described in the above method implementations.

It is to be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the disclosure. The memory includes various medium capable of storing program codes, such as a universal serial bus (USB) flash disk, a read-only memory (ROM), a RAM, a removable hard disk, a disk, a CD, or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the disclosure in detail. The principle and implementations of the disclosure are illustrated by specific examples. The illustration of the above implementations is merely used to facilitate understanding of the methods and core concept of the disclosure. For a person skilled in the art, according to the concept of the disclosure, specific implementations and application ranges may be both changed. Based on the above, the disclosure shall not be understood to be limited to the specification.

What is claimed is:

1. A method for controlling display for an electronic device comprising a display screen and a speaker, the method comprising:
 obtaining first audio data during outputting sound through the speaker, and obtaining an operating frequency of the speaker for playing the first audio data;
 obtaining a first mobile industry processor interface (MIPI) operating frequency of an MIPI of the display screen;
 determining that a percentage of interfered audio in the first audio data is greater than a first threshold in response to determining that the operating frequency of the speaker for playing the first audio data is interfered by the first MIPI operating frequency; and adjusting the first MIPI operating frequency of the MIPI of the display screen to a target frequency and a percentage of audio to be interfered in the first audio data is less than a second threshold, wherein the second threshold is less than the first threshold.

2. The method of claim 1, wherein obtaining the first audio data comprises one of:

obtaining a music file in response to detecting that the speaker is in a music-file playing state and determining a part of the music file that is not played to be the first audio data; and obtaining call voice in response to detecting that the speaker is in a call state and determining the call voice as the first audio data.

3. The method of claim 2, wherein obtaining the operating frequency of the speaker for playing the first audio data comprises:

obtaining a sampling frequency of the first audio data; and determining, according to the sampling frequency, the operating frequency of the speaker for playing the first audio data.

4. The method of claim 2, further comprising:

prior to determining that the operating frequency of the speaker for playing the first audio data is interfered by the first MIPI operating frequency, establishing an operating frequency-interference frequency correspondence table, wherein establishing the operating frequency-interference frequency correspondence table comprises:

obtaining a plurality of MIPI operating frequencies of the MIPI of the display screen;

for each MIPI operating frequency, determining at least one interference frequency corresponding to the MIPI operating frequency; and establishing the operating frequency-interference frequency correspondence table for the plurality of MIPI operating frequencies according to the at least one interference frequency corresponding to each MIPI operating frequency.

5. The method of claim 4, wherein determining that the operating frequency of the speaker for playing the first audio data is interfered by the first MIPI operating frequency comprises:

determining that the operating frequency of the speaker for playing the first audio data matches an interference frequency in the operating frequency-interference frequency correspondence table;

obtaining an MIPI operating frequency corresponding to the interference frequency; and determining that the operating frequency of the speaker for playing the first audio data is interfered by the first MIPI operating frequency in response to determining that the MIPI operating frequency corresponding to the interference frequency matches the first MIPI operating frequency.

6. The method of claim 1, further comprising:

prior to determining that the percentage of the interfered audio in the first audio data is greater than the first threshold, obtaining R periodic audio blocks by dividing the first audio data into the R periodic audio blocks according to a preset period, R being an integer greater than 0;

determining S periodic audio blocks interfered by the first MIPI operating frequency from the R periodic audio blocks, S being an integer greater than 0 and not greater than R; and obtaining the percentage of the interfered audio in the first audio data according to the R periodic audio blocks and the S periodic audio blocks interfered by the first MIPI operating frequency.

7. The method of claim 6, wherein determining the periodic audio blocks interfered by the first MIPI operating frequency comprises:

for each periodic audio block interfered by the first MIPI operating frequency:

obtaining a plurality of audio units by dividing the periodic audio block into the plurality of audio units according to at least one sampling period corresponding to the periodic audio block;

determining a number of audio units that are interfered by the first MIPI operating frequency from the plurality of audio units, and obtaining a percentage of interfered audio units in the plurality of audio units according to the number of the audio units that are interfered by the first MIPI operating frequency and a total number of the plurality of audio units; and determining that the periodic audio block is interfered by the first MIPI operating frequency in response to the percentage of the interfered audio units in the plurality of audio units being greater than a third threshold.

8. The method of claim 1, wherein adjusting the first MIPI operating frequency of the MIPI of the display screen to the target frequency comprises:

obtaining a target value of a screen parameter associated with the target frequency; and adjusting a value of the screen parameter to the target value and adjusting the first MIPI operating frequency of the MIPI of the display screen to the target frequency.

9. An electronic device, comprising:

a display screen;

a speaker;

a processor; and a memory coupled to the processor and storing one or more programs;

wherein the one or more programs which, when executed by the processor, cause the processor to:

obtain first audio data during outputting sound through the speaker of the electronic device, and obtain an operating frequency of the speaker for playing the first audio data;

obtain a first mobile industry processor interface (MIPI) operating frequency of an MIPI of the display screen;

determine that a percentage of interfered audio in the first audio data is greater than a first threshold in response to determining that the operating frequency of the speaker for playing the first audio data is interfered by the first MIPI operating frequency; and adjust the first MIPI operating frequency of the MIPI of the display screen to a target frequency and a percentage of audio to be interfered in the first audio data is less than a second threshold, wherein the second threshold is less than the first threshold.

10. The electronic device of claim 9, wherein the one or more programs executed by the processor to obtain the first audio data are executed by the processor to:

obtain a music file in response to detecting that the speaker is in a music-file playing state and determine a part of the music file that is not played to be the first audio data; and obtain call voice in response to detecting that the speaker is in a call state and determine the call voice as the first audio data.

11. The electronic device of claim 10, wherein the one or more programs executed by the processor to obtain the operating frequency of the speaker for playing the first audio data are executed by the processor to:

obtain a sampling frequency of the first audio data; and determine, according to the sampling frequency, the operating frequency of the speaker for playing the first audio data.

12. The electronic device of claim 10, wherein the one or more programs, when executed by the processor, further cause the processor to:

prior to determining that the operating frequency of the speaker for playing the first audio data is interfered by the first MIPI operating frequency, establish an operating frequency-interference frequency correspondence table, wherein the one or more programs executed by the processor to establish the operating frequency-interference frequency correspondence table are executed by the processor to:

obtain a plurality of MIPI operating frequencies of the MIPI of the display screen;

determine, for each MIPI operating frequency, at least one interference frequency corresponding to the MIPI operating frequency; and establish the operating frequency-interference frequency correspondence table for the plurality of MIPI operating frequencies according to the at least one interference frequency corresponding to each MIPI operating frequency.

13. The electronic device of claim 12, wherein the one or more programs executed by the processor to determine that the operating frequency of the speaker for playing the first audio data is interfered by the first MIPI operating frequency are executed by the processor to:

determine that the operating frequency of the speaker for playing the first audio data matches an interference frequency in the operating frequency-interference frequency correspondence table;

obtain an MIPI operating frequency corresponding to the interference frequency; and determine that the operating frequency of the speaker for playing the first audio data is interfered by the first MIPI operating frequency in response to determining that the MIPI operating frequency corresponding to the interference frequency matches the first MIPI operating frequency.

14. The electronic device of claim 9, wherein the one or more programs, when executed by the processor, further cause the processor to:

prior to determining that the percentage of the interfered audio in the first audio data is greater than the first threshold, obtain R periodic audio blocks by dividing the first audio data into the R periodic audio blocks according to a preset period, R being an integer greater than 0;

determine S periodic audio blocks interfered by the first MIPI operating frequency from the R periodic audio blocks, S being an integer greater than 0 and not greater than R; and obtain the percentage of the interfered audio in the first audio data according to the R periodic audio blocks and the S periodic audio blocks interfered by the first MIPI operating frequency.

15. The electronic device of claim 14, wherein the one or more programs executed by the processor to determine the periodic audio blocks interfered by the first MIPI operating frequency are executed by the processor to:

for each periodic audio block interfered by the first MIPI operating frequency:

obtain a plurality of audio units by dividing the periodic audio block into the plurality of audio units according to at least one sampling period corresponding to the periodic audio block;

determine a number of audio units that are interfered by the first MIPI operating frequency from the plurality of audio units, and obtain a percentage of interfered audio units in the plurality of audio units according to the number of the audio units that are interfered by the first MIPI operating frequency and a total number of the plurality of audio units; and determine that the periodic audio block is interfered by the first MIPI operating frequency in response to determining that the percentage of the interfered audio units in the plurality of audio units is greater than a third threshold.

16. The electronic device of claim 9, wherein the one or more programs executed by the processor to adjust the first MIPI operating frequency of the MIPI of the display screen to the target frequency are executed by the processor to:

obtain a target value of a screen parameter associated with the target frequency; and adjust a value of the screen parameter to the target value and adjust the first MIPI operating frequency of the MIPI of the display screen to the target frequency.

17. A non-transitory computer readable storage medium storing computer programs, wherein the computer programs, when executed by a processor, cause the processor to:

obtain first audio data during outputting sound through a speaker of an electronic device, and obtain an operating frequency of the speaker for playing the first audio data;

obtain a first mobile industry processor interface (MIPI) operating frequency of an MIPI of a display screen of an electronic device;

determine that a percentage of interfered audio in the first audio data is greater than a first threshold, in response to determining that the operating frequency of the speaker for playing the first audio data is interfered by the first MIPI operating frequency; and adjust the first MIPI operating frequency of the MIPI of the display screen to a target frequency and a percentage of audio to be interfered in the first audio data is less than a second threshold, wherein the second threshold is less than the first threshold.

18. The non-transitory computer readable storage medium of claim 17, wherein the computer programs, when executed by the processor, further cause the processor to:

prior to determining that the percentage of the interfered audio in the first audio data is greater than the first threshold, obtain R periodic audio blocks by dividing the first audio data into the R periodic audio blocks according to a preset period, R being an integer greater than 0;

determine S periodic audio blocks interfered by the first MIPI operating frequency from the R periodic audio blocks, S being an integer greater than 0 and not greater than R; and obtain the percentage of the interfered audio in the first audio data according to the R periodic audio blocks and the S periodic audio blocks interfered by the first MIPI operating frequency.

19. The non-transitory computer readable storage medium of claim 18, wherein to determine the periodic audio blocks interfered by the first MIPI operating frequency, the computer programs, when executed by the processor, cause the processor to:

for each periodic audio block interfered by the first MIPI operating frequency:
  obtain a plurality of audio units by dividing the periodic audio block into the plurality of audio units according to at least one sampling period corresponding to the periodic audio block;
  determine a number of audio units that are interfered by the first MIPI operating frequency from the plurality of audio units, and obtain a percentage of interfered audio units in the plurality of audio units according to the number of the audio units that are interfered by the first MIPI operating frequency and a total number of the plurality of audio units; and
  determine that the periodic audio block is interfered by the first MIPI operating frequency in response to determining that the percentage of the interfered audio units in the plurality of audio units is greater than a third threshold.

20. The non-transitory computer readable storage medium of claim 19, wherein to adjust the first MIPI operating frequency of the MIPI of the display screen to the target frequency, the computer programs, when executed by the processor, cause the processor to:

obtain a target value of a screen parameter associated with the target frequency; and adjust a value of the screen parameter to the target value, and adjust the first MIPI operating frequency of the MIPI of the display screen to the target frequency.

* * * * *